(12) United States Patent
Takatani

(10) Patent No.: US 9,189,183 B2
(45) Date of Patent: Nov. 17, 2015

(54) IMAGE PROCESSING APPARATUS, AND CONTROL METHOD THEREOF, AND RECORDING MEDIUM

(71) Applicant: CANON KABUSHIKI KAISHA, Tokyo (JP)

(72) Inventor: Tamotsu Takatani, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/957,174

(22) Filed: Aug. 1, 2013

(65) Prior Publication Data

US 2014/0036294 A1 Feb. 6, 2014

(30) Foreign Application Priority Data

Aug. 6, 2012 (JP) .................................. 2012-173684

(51) Int. Cl.
*G06F 3/12* (2006.01)
*G06K 15/00* (2006.01)
*G03G 15/00* (2006.01)
*H04N 1/00* (2006.01)

(52) U.S. Cl.
CPC .......... *G06F 3/1221* (2013.01); *G03G 15/5004* (2013.01); *G06F 3/1213* (2013.01); *G06F 3/1229* (2013.01); *G06F 3/1279* (2013.01); *G06K 15/406* (2013.01); *H04N 1/00896* (2013.01); *H04N 1/00928* (2013.01); *Y02B 60/1271* (2013.01)

(58) Field of Classification Search
CPC .......... H04N 1/00885; H04N 1/00896; H04N 1/00901; H04N 1/00928; G06K 15/00; G06K 2215/0085; G06K 15/406; G06F 3/1221; G06F 3/1213; G06F 3/1229; G06F 3/1279; G03G 15/5004

USPC ............ 358/1.1, 1.4, 1.5, 1.6, 1.9, 1.11, 1.12, 358/1.13, 1.14, 1.15, 1.16, 1.17, 1.18

See application file for complete search history.

(56) References Cited

U.S. PATENT DOCUMENTS

| | | | |
|---|---|---|---|
| 6,693,717 B1 * | 2/2004 | Teradaira et al. | 358/1.14 |
| 2004/0146313 A1 | 7/2004 | Uchizono | |
| 2006/0203306 A1 | 9/2006 | Hoshi | |
| 2010/0226662 A1 | 9/2010 | Takatani | |
| 2010/0257386 A1 | 10/2010 | Hanada | |
| 2011/0004776 A1 * | 1/2011 | Tanaka | 713/323 |
| 2011/0296219 A1 | 12/2011 | Okuda | |

FOREIGN PATENT DOCUMENTS

| | | |
|---|---|---|
| CN | 101827186 A | 9/2010 |
| JP | 2010-201770 A | 9/2010 |
| JP | 2011-215595 A | 10/2011 |

* cited by examiner

*Primary Examiner* — Thierry L Pham
(74) *Attorney, Agent, or Firm* — Canon USA Inc. IP Division

(57) ABSTRACT

An image processing apparatus controls a plurality of devices to perform image processing, and includes a reception unit configured to receive a job when a power supply state to each device is in a power-saving state, a determination unit configured to determine whether the received job uses a device performing a print function, and a control unit configured to, when it is determined that the device performing the print function is not used, supply power to the device performing the print function to perform predetermined initialization processing according to an elapsed time after the device performing the print function has been moved to the power-saving state.

8 Claims, 2 Drawing Sheets

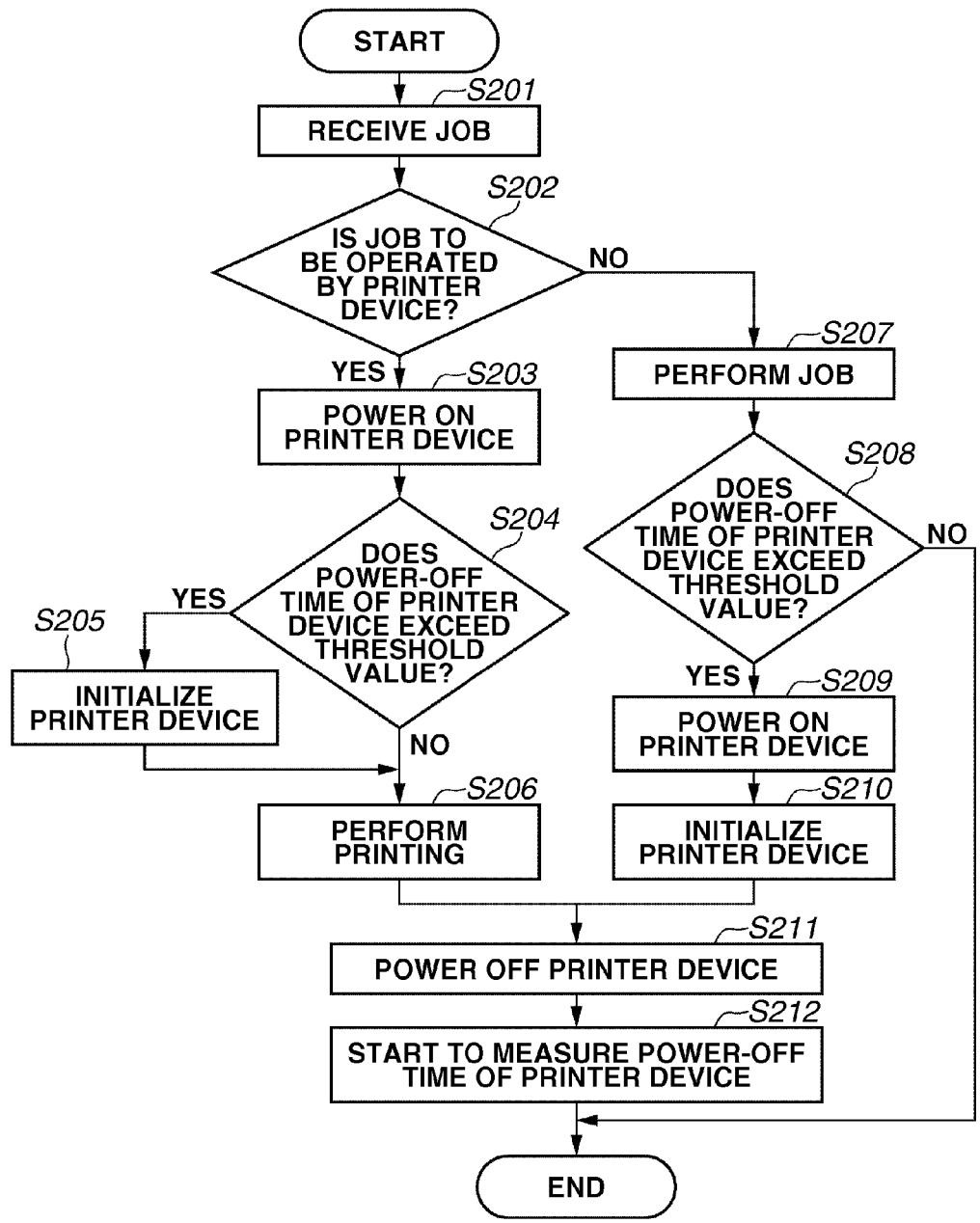

IMAGE PROCESSING APPARATUS, AND CONTROL METHOD THEREOF, AND RECORDING MEDIUM

BACKGROUND OF THE INVENTION

1. Field of the Invention

The present invention relates to an image processing apparatus, and a control method thereof, and a recording medium.

2. Description of the Related Art

With an increasing energy-saving consciousness, an image processing apparatus including a printer and a multifunction peripheral (MFP) is provided (mounted) with a function for operating the apparatus with low power. Particularly, for the purpose of reducing power consumption during waiting, so in a waiting state waiting for a user's operation, a function for powering off a device, for example, a printer device and a scanner device, which is not in operation, is provided.

Conventionally, responsiveness to the user's operation has been emphasized, and thus even in the waiting state, where the apparatus is not in operation, the device relating to image processing is kept power-on. A user determines a device required when a job operated by the printer device and the scanner device is input to the image processing apparatus, and then powers on the device, so as to reduce the power consumption in the waiting state.

Upon reception of the user's operation, in a case where the device is powered on when the device required for the operation is determined, compared with a case where the power is always supplied to the device, more time is required to complete the job since the device needs to be initialized before the job is performed.

Further, Japanese Patent Application Laid-Open No. 2011-215595 discusses that, when the image processing apparatus such as a printer is left with no power supplied for a long time, an initialization operation to be performed before printing requires more time than a normal initialization operation such as a stirring operation of toner.

As described above, when the device is initialized upon the reception of the user's operation and the printer is left for a long time with no power supplied, more time is required to start execution of a job.

SUMMARY OF THE INVENTION

The present invention is directed to an image processing apparatus.

The present invention provides a system where, when an image processing apparatus receives a job, other than a print job, in a power-saving state, a device performing a print function is initialized to reduce a waiting time for performing a print job.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 is a flowchart illustrating a control method of the image processing apparatus.

DESCRIPTION OF THE EMBODIMENTS

Figure 1:
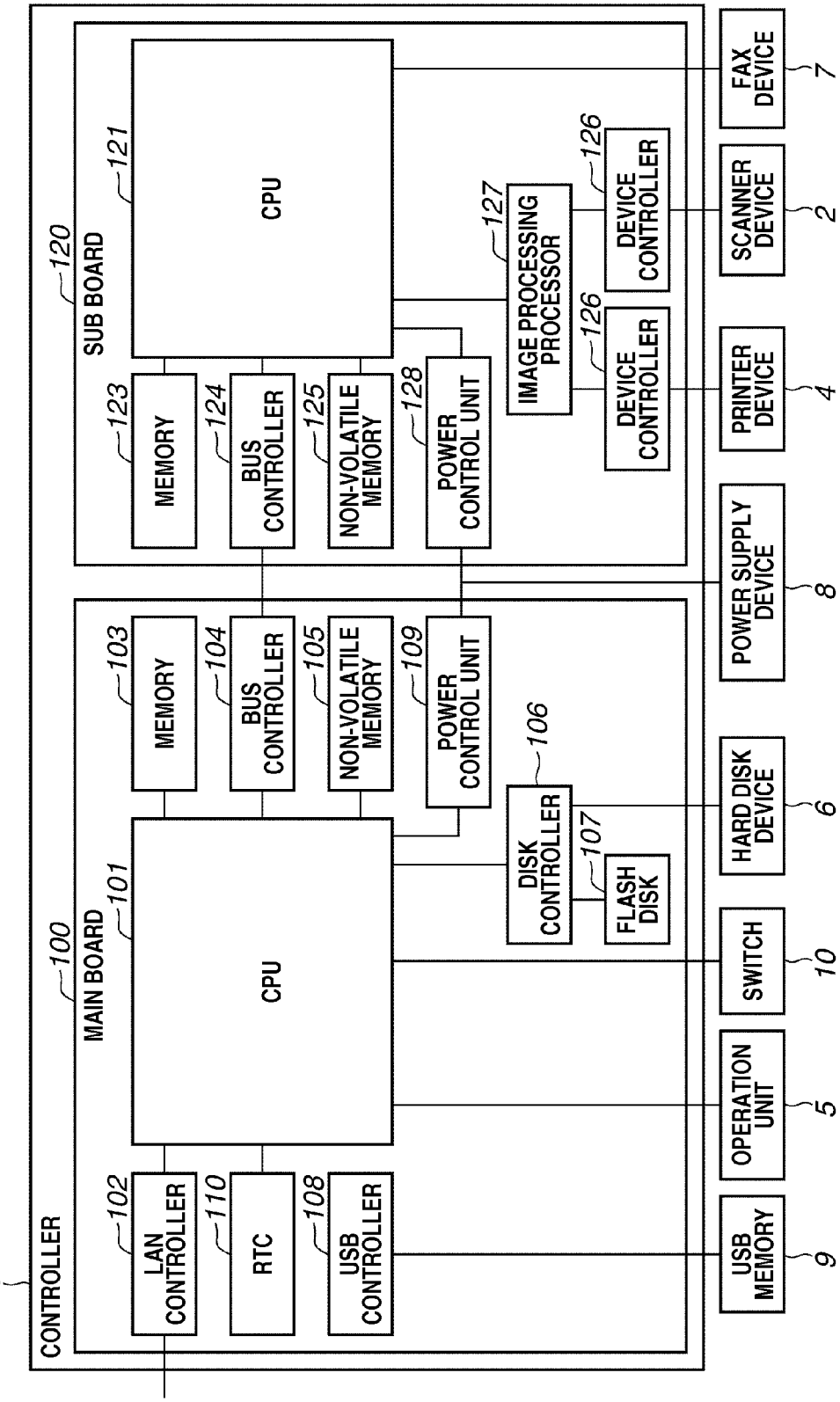
FIG. 1 is a block diagram illustrating a configuration of an image processing apparatus.

With reference to the accompanying figures, an embodiment of the present invention will be described below.

<System Configuration>

FIG. 1 is a block diagram illustrating a configuration of an image processing apparatus illustrating a present exemplary embodiment. This example describes an MFP as one example of the image processing apparatus.

As illustrated in FIG. 1, a controller 1 includes a main board 100 and a sub board 120.

The main board 100 includes a versatile central processing unit (CPU) system. A CPU 101 controls an entire board. A local area network (LAN) controller 102 communicates with an external device via a network. A memory 103 includes a random access memory (RAM) and the like, and is used by the CPU 101 as a work memory. A bus controller 104 has a bridge function with an external bus.

A non-volatile memory 105 does not lose information even when a power is shut down. A real-time clock (RTC) 110 retains a time with a battery even when the power is shut down.

A disk controller 106 controls a storage device. According to the present exemplary embodiment, the storage device includes a flash disk solid state drive (SSD) 107, which is a storage device that has a relatively small capacity and is formed of a semiconductor device, and a hard disk device 6.

A universal serial bus (USB) controller 108 controls a USB device.

A USB memory 9, an operation unit 5 and the hard disk device 6 are externally connected to the main board 100. The storage device may not necessarily be the hard disk device 6, and any type of non-volatile device may be used as long as it is a non-volatile device.

The sub board 120 includes a comparatively small versatile CPU system and an image processing hardware.

A CPU 121 controls an entire board. A memory 123 is used by the CPU 121 as a work memory. A bus controller 124 has the bridge function with the external bus. A non-volatile memory 125 does not lose the information even when the power is shut down.

An image processing processor 127 performs real-time digital image processing. A device controller 126 is also provided.

An external scanner device 2 and an external printer device 4 transmit/receive digital image data via the device controller 126. A fax device 7 is directly controlled by the CPU 121.

Further, the power of the main board 100 and the sub board 120 is supplied from a power supply device 8. Power control units 109 and 128 manage to supply the power to units on the main board 100 and the sub board 120 respectively that require the power.

The power switch 10 receives a user's operation to power on and off and, when the power switch is operated, the CPU 101 is interrupted. When the CPU 101 detects the interruption, it controls the power control unit 109 according to a state. Further, the CPU 121 detects the operation of the power switch 10 via the bus controllers 104 and 124, and then controls the power control unit 128.

For example, the CPU 101 and the CPU 121 include a great number of types of CPU peripheral hardware such as a chip set, a bus bridge, and a clock generator. However, since they do not require for the description, they are simply described and their block configuration does not limit the present invention. An example of copying processing by the controller 1 will be described below.

Upon reception of a user's instruction for copying an image via the operation unit 5, the CPU 101 transmits an image-reading direction to the scanner device 2 via the CPU 121 of the sub board 120.

The scanner device 2 performs optical scanning on a paper document laid on a platen (not illustrated) or fed from an automatic document feeder (ADF). At this point, image data scanned by the scanner device 2 is converted into digital image data, and the converted digital image data is input into the image processing processor 127 via the device controller 126.

The image processing processor 127 performs a direct memory access (DMA) transfer to the memory 123 via the CPU 121 to temporarily store the digital image data.

When it is confirmed that a predetermined amount of the digital image data or an entire digital image data is input into the memory 123, the CPU 101 of the main board 100 instructs the printer device 4 to output an image via the CPU 121. The CPU 121 notifies the image processing processor 127 of an address of the image data stored in the memory 123.

According to a synchronization signal from the printer device 4, the image data stored in the memory 123 is transmitted to the printer device 4 via the image processing processor 127 and the device controller 126, and then the digital image data is printed on a sheet by the printer device 4.

At this point, when a plurality of copies is to be printed, the CPU 101 stores in the hard disk device 6 the image data that has been stored in the memory 123 and, thus in subsequent printing, the image can be transmitted to the printer device 4 without receiving the image from the scanner device 2.

The power control unit 128 performs control each device of the sub board 120 to stop power feeding (power supply) to the printer device 4 and the scanner device 2 in the waiting state of job processing until a job with a printing operation and a scanning operation is received from the user.

When the CPU 101 receives the user's operation from the operation unit 5 and determines that the job requires a print function, the power control unit 128 performs control so that the power feeding to the printer device 4 can be started to perform an initialization operation of the printer device 4.

When the initialization is completed, the job input by the user's operation is performed. When a predetermined time elapses after the job has been completed, the controller 1 is set to be in the waiting state of the job processing again. The power control unit 128 stops the power feeding to the printer device 4 and the scanner device 2, to which the power feeding is started when the job is performed.

FIG. 2 is a flowchart illustrating a control method of the image processing apparatus illustrating the present exemplary embodiment.

This example describes control for performing initialization processing requiring stirring processing of developer stored in a development device included in the printer device 4, when a specified job such as a scanning job, a data transmission job, a box processing job, and a memory transmission job, which does not use the printer device 4, is performed according to the present exemplary embodiment.

Each step can be realized by the CPUs 101 and 121 executing a control program loaded into the memories 103 and 123. Control will be described in detail below in which, even if a job is received when the power supply state to each device is set to be in the power-saving state and the job does not use the print function, when an elapsed time after the device performing the print function has moved to the power-saving state exceeds a predetermined threshold value, the power supply to the device performing the print function is resumed to perform predetermined initialization processing.

A plurality of devices according to the present exemplary embodiment includes a device performing the print function, a device performing a scanner function, a device performing a sending function, and a device performing a box function for storing the data in a box.

In step S201, the user issues a job to the controller 1 via the operation unit 5 or the LAN controller 102. The CPU 101 of the main board 100 receives the issued job.

In step S202, the CPU 101 interprets the job received in step S201, and determines whether the job requires an operation of the printer device 4. When the CPU 101 determines that the job needs to use the printer device 4 (YES in step S202), the processing proceeds to step S203. When the CPU 101 determines that the job does not need to use the printer device 4 (NO in step S202), the processing proceeds to step S207. The processing for determining whether to use the printer device 4 in step S202 corresponds to processing for determining whether to use the print function.

In step S203, the CPU 101 instructs the CPU 121 of the sub board 120 to power on the printer device 4. The CPU 121 powers on the printer device 4 via the device controller 126.

In step S204, the CPU 101 acquires a time from the RTC 110, and determines whether a time period of a power-off time of the printer device 4 exceeds a predetermined threshold value. The threshold value herein is a time period set according to a feature of the printer device 4 and a user's usage environment, and may be any number of hours. When the CPU 101 determines that the time exceeds the threshold value (YES in step S204), the processing proceeds to step S205. When the CPU 101 determines that the time does not exceed the threshold value (NO in step S204), the processing proceeds to step S206.

In step S205, the CPU 121 instructs the printer device 4 to perform the initialization via the device controller 126. The printer device 4 that has received the initialization instruction performs the above-described predetermined initialization processing, which is performed when the power-off time exceeds the threshold value. Since the processing for stirring the developer, for example, is included herein, a sufficient time is required to complete the initialization processing.

In step S206, the CPU 121 instructs the printer device 4 to perform printing via the device controller 126. The printer device 4 performs print processing based on the job, and notifies the CPU 121 of a print completion state after the printing is completed.

In step S207, the CPU 121 performs the job received in step S201. This job does not use the printer device 4 in step S202 and, for example, is the scanning job that uses only the scanner device 2.

In step S208, the CPU 101 acquires the time from the RTC 110, and determines whether the power-off time of the printer device 4 exceeds the threshold value. The power-off time corresponds to the elapsed time after the device performing the print function has been moved to the power-saving state.

The threshold value is the time period set according to the feature of the printer device 4 and the user's usage environment, and may be any number of hours. When the CPU 101 determines that the elapsed time exceeds the threshold value (YES in step S208), the processing proceeds to step S209. When the CPU 101 determines that the elapsed time does not exceed the threshold value (NO in step S208), the processing ends.

In step S209, the CPU 101 instructs the CPU 121 of the sub board 120 to power on the printer device 4. The CPU 121 powers on the printer device 4 via the device controller 126.

In step S210, the CPU 121 instructs the printer device 4 to perform the initialization via the device controller 126. The printer device 4 that has received the initialization instruction performs the predetermined initialization to be performed when the power-off time exceeds the predetermined time. In step S210 executed by the CPU 121, the power is supplied to the device performing the print function. The processing in step S210 corresponds to processing for performing the predetermined initialization processing.

In step S211, the CPU 101 instructs the CPU 121 of the sub board 120 to power off the printer device 4. The CPU 121 powers off the printer device 4 via the device controller 126.

In step S212, the CPU 101 starts to measure the power-off time of the printer using the RTC 110. When the printer device 4 is activated next time, the measured value is referred to, at the time of determination as to whether the power-off time exceeds the threshold value in steps S204 and S208.

According to the present exemplary embodiment, corresponding to the time elapsing in the waiting state of the job, the image processing apparatus performs the initialization processing for performing the print function when the job other than the print job is required, thereby reducing the waiting time to perform the print job.

If the device is not powered off in the waiting state, it is determined whether the power-off time exceeds the threshold value when the power supply is started to activate the device, or when the device is returned from a low-power state.

Further, since the image processing apparatus to which the present exemplary embodiment is applied powers off the device even in the waiting state, the power-off time of the device cannot be determined only when the device is activated or when it is recovered from the low-power state.

Thus, the image processing apparatus makes determination based on the determination in steps S204 and S208, when the job for starting the power supply to the device is performed. Further, according to the present exemplary embodiment, based on the determination in step S202, if it is determined that the power-off time exceeds the threshold value considering the initialization time of the device even when the job is performed in which the power is not normally supplied to the printer device 4, the power is supplied to the printer device 4 to perform the above-described initialization processing.

The job that is not operated by the printer device 4 includes the function for transmitting fax operated only by the scanner, or storing the document in a reading storage, as described above.

Aspects of the present invention can also be realized by a computer of a system or apparatus (or devices such as a CPU or MPU) that reads out and executes a program recorded on a memory device (computer-readable medium) to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims the benefit of Japanese Patent Application No. 2012-173684 filed Aug. 6, 2012, which is hereby incorporated by reference herein in its entirety.

What is claimed is:

1. A printing apparatus having a print device comprising:
   a reception unit for receiving a first job which causes the print device to perform print processing and a second job which causes the print device not to perform print processing; and
   a control unit for performing an initialization of the print device after power is supplied to the print device, in a case that a job received by the reception unit when the print device is powered off is the second job and a time elapsed when the print device has been powered off exceeds a threshold value,
   wherein the control unit does not perform the initialization of the print device in a case that the job received by the reception unit when the print device is powered off is the second job and the time elapsed when the print device has been powered off does not exceed the threshold value.

2. A printing apparatus according to claim 1, wherein, after the initialization of the print device has been performed, the control unit is configured to power off the print device.

3. A printing apparatus according to claim 1, wherein the control unit further comprises a measuring unit that measures the time elapsed when the print device has been powered off, and
   wherein the control unit performs the initialization of the print device in a case that the job received by the reception unit when the print device is powered off is the second job and time measured by the measuring unit exceeds the threshold value, and does not perform the initialization of the print device in a case that the job received by the reception unit when the print device is powered off is the second job and time measured by the measuring unit does not exceed the threshold value.

4. A printing apparatus according to claim 1, wherein the control unit powers on the print device in a case that the job received by the reception unit when the print device is powered off is the second job and the time elapsed when the print device has been powered off exceeds the threshold value, and does not power on the print device in a case that the job received by the reception unit when the print device is powered off is the second job and the time elapsed when the print device is powered off does not exceed the threshold value.

5. A method of controlling a printing apparatus having a print device, the control method comprising:
   receiving a first job which causes the print device to perform a print processing;
   receiving a second job which causes the print device not to perform print processing; and
   performing an initialization of the print device after power is supplied to the print device in a case that a job received when the print device is powered off is the second job and a time elapsed when the print device has been powered off exceeds a threshold value, and does not initialize the print device in a case that the job received when the print device is powered off is the second job and the time elapsed when the print device has been powered off does not exceed the threshold value.

6. A non-transitory computer readable medium storing a program that performs the method of claim 5.

7. A printing apparatus according to claim 1, initialization of the print device includes initializing a development device included in the print device.

8. A printing apparatus according to claim 1, wherein the control unit performs an initialization of the print device after power is supplied to the print device, in a case that the job received by the reception unit when the print device is power off is the first job.

\* \* \* \* \*